US012558784B2

(12) United States Patent
Hida et al.

(10) Patent No.: US 12,558,784 B2
(45) Date of Patent: Feb. 24, 2026

(54) MOTION TRAJECTORY GENERATION METHOD FOR ROBOT, MOTION TRAJECTORY GENERATION APPARATUS FOR ROBOT, ROBOT SYSTEM, AND PROGRAM

(71) Applicant: Kobe Steel, Ltd., Kobe (JP)

(72) Inventors: Masatoshi Hida, Kobe (JP); Fumiaki Sawakawa, Kobe (JP)

(73) Assignee: Kobe Steel, Ltd., Kobe (JP)

( * ) Notice: Subject to any disclaimer, the term of this patent is extended or adjusted under 35 U.S.C. 154(b) by 286 days.

(21) Appl. No.: 18/318,051

(22) Filed: May 16, 2023

(65) Prior Publication Data

US 2023/0398688 A1 Dec. 14, 2023

(30) Foreign Application Priority Data

Jun. 10, 2022 (JP) ................................. 2022-094604

(51) Int. Cl.
*B25J 9/16* (2006.01)
*B23K 37/02* (2006.01)
(52) U.S. Cl.
CPC ......... B25J 9/1664 (2013.01); B23K 37/0229 (2013.01); B25J 9/163 (2013.01)
(58) Field of Classification Search
CPC ........ B25J 9/1664; B25J 9/163; B25J 9/1653; B25J 11/005; B23K 37/0229; B23K 37/02; G05B 2219/40519; G05B 2219/45104; G05B 2219/45135
See application file for complete search history.

(56) References Cited

U.S. PATENT DOCUMENTS

| | | | | |
|---|---|---|---|---|
| 9,724,826 | B1 * | 8/2017 | Prats | ...................... B25J 9/1664 |
| 11,072,070 | B2 * | 7/2021 | Seno | ........................... B25J 9/06 |
| 2016/0031082 | A1 * | 2/2016 | Hazan | ..................... B25J 9/1664 |
| | | | | 700/250 |
| 2019/0099891 | A1 * | 4/2019 | Tomioka | ................ B25J 9/1697 |
| 2022/0379473 | A1 * | 12/2022 | Yamauchi | .......... G05B 19/4093 |

FOREIGN PATENT DOCUMENTS

| | | |
|---|---|---|
| JP | 2000-94131 A | 4/2000 |
| JP | 3639873 B2 | 4/2005 |
| JP | 2010-046753 A | 3/2010 |
| JP | 2019-135076 A | 8/2019 |
| KR | 10-2019-0134554 A | 12/2019 |

* cited by examiner

*Primary Examiner* — Adam R Mott
*Assistant Examiner* — Sagar Kc
(74) *Attorney, Agent, or Firm* — Oblon, McClelland, Maier & Neustadt, L.L.P.

(57) ABSTRACT

A motion trajectory generation method for generating a motion trajectory of a robot having a plurality of drive axes upon carrying out work at a work position includes: an obtaining step of obtaining a motion condition identified and corresponding to the work position; and a generation step of generating a motion trajectory of the robot by carrying out a search for a plurality of motion trajectories that the robot is able to implement, on the basis of the motion condition, in which in the generation step, priority levels in the search are determined on the basis of the motion condition and work directions for a plurality of work positions, and the search for the plurality of motion trajectories is carried out on the basis of the priority levels.

10 Claims, 15 Drawing Sheets

MOTION TRAJECTORY GENERATION METHOD FOR ROBOT, MOTION TRAJECTORY GENERATION APPARATUS FOR ROBOT, ROBOT SYSTEM, AND PROGRAM

BACKGROUND OF THE INVENTION

1. Field of the Invention

The present invention relates to a motion trajectory generation method for a robot, a motion trajectory generation apparatus for a robot, a robot system, and a program.

2. Description of the Related Art

With the advancement of robots that carry out predetermined work on workpieces, such robots are being frequently used in various industrial fields. These robots include an arm, and the pose of the arm is controlled to thereby adjust the position of the distal end part of the arm for carrying out predetermined work. To control a robot, teaching data is generated, and the robot is moved on the basis of the teaching data. To generate the teaching data, the user of the robot manually makes settings individually or a motion trajectory generation apparatus provided for the robot is made to automatically generate the teaching data. Upon control of the pose of a robot and the trajectory in a series of motions for the pose, the state of the workpiece and the effect of nearby colliding objects and so on need to be taken into consideration.

For example, Japanese Unexamined Patent Application Publication No. 2000-94131 discloses a configuration for a multi-joint welding robot having a plurality of axes, in which a possible set pose of a welding torch at the distal end of the arm is searched for and automatically set on the basis of an input target pose.

SUMMARY OF THE INVENTION

For example, manual generation of teaching data involves a very high workload because various parameters need to be taken into consideration. Generation of teaching data by a motion trajectory generation apparatus may involve a long processing time because a search through a large number of options is needed in order to calculate an appropriate trajectory. Therefore, there has been a demand for a method for determining a motion trajectory of a robot in a shorter processing time.

Accordingly, an object of the present invention is, in generation of a motion trajectory related to control of a robot, to generate an appropriate pose and its trajectory of the robot while reducing a processing time taken to generate the motion trajectory.

To address the above-described issues, an aspect of the present invention provides a configuration as follows. A motion trajectory generation method for generating a motion trajectory of a robot having a plurality of drive axes upon carrying out work at a work position includes:

an obtaining step of obtaining a motion condition identified and corresponding to the work position; and a generation step of generating a motion trajectory of the robot by carrying out a search for a plurality of motion trajectories that the robot is able to implement, on the basis of the motion condition, in which in the generation step, priority levels in the search are determined on the basis of the motion condition and work directions for a plurality of work positions, and the search for the plurality of motion trajectories is carried out on the basis of the priority levels.

Another aspect of the present invention provides a configuration as follows. A motion trajectory generation apparatus for generating a motion trajectory of a robot having a plurality of drive axes upon carrying out work at a work position includes:

obtaining means for obtaining a motion condition identified and corresponding to the work position; and generation means for generating a motion trajectory of the robot by carrying out a search for a plurality of motion trajectories that the robot is able to implement, on the basis of the motion condition, in which the generation means determines priority levels in the search on the basis of the motion condition and work directions for a plurality of work positions, and carries out the search for the plurality of motion trajectories on the basis of the priority levels.

Yet another aspect of the present invention provides a configuration as follows. A robot system includes:

a robot having a plurality of drive axes; and a motion trajectory generation apparatus, the motion trajectory generation apparatus including:

obtaining means for obtaining a motion condition identified and corresponding to the work position; and generation means for generating a motion trajectory of the robot by carrying out a search for a plurality of motion trajectories that the robot is able to implement, on the basis of the motion condition, in which the generation means determines priority levels in the search on the basis of the motion condition and work directions for a plurality of work positions, and carries out the search for the plurality of motion trajectories on the basis of the priority levels.

Yet another aspect of the present invention provides a configuration as follows. A program causes a computer to perform:

an obtaining step of obtaining a motion condition identified and corresponding to a work position at which a robot having a plurality of drive axes carries out work; and a generation step of generating a motion trajectory of the robot by carrying out a search for a plurality of motion trajectories that the robot is able to implement, on the basis of the motion condition, in which in the generation step, priority levels in the search are determined on the basis of the motion condition and work directions for a plurality of work positions, and the search for the plurality of motion trajectories is carried out on the basis of the priority levels.

According to the present invention, in generation of a motion trajectory related to control of a robot, it is possible to generate an appropriate pose and its series of trajectories of the robot while reducing a processing time taken to generate the motion trajectory.

DESCRIPTION OF THE PREFERRED EMBODIMENTS

Figure 1:
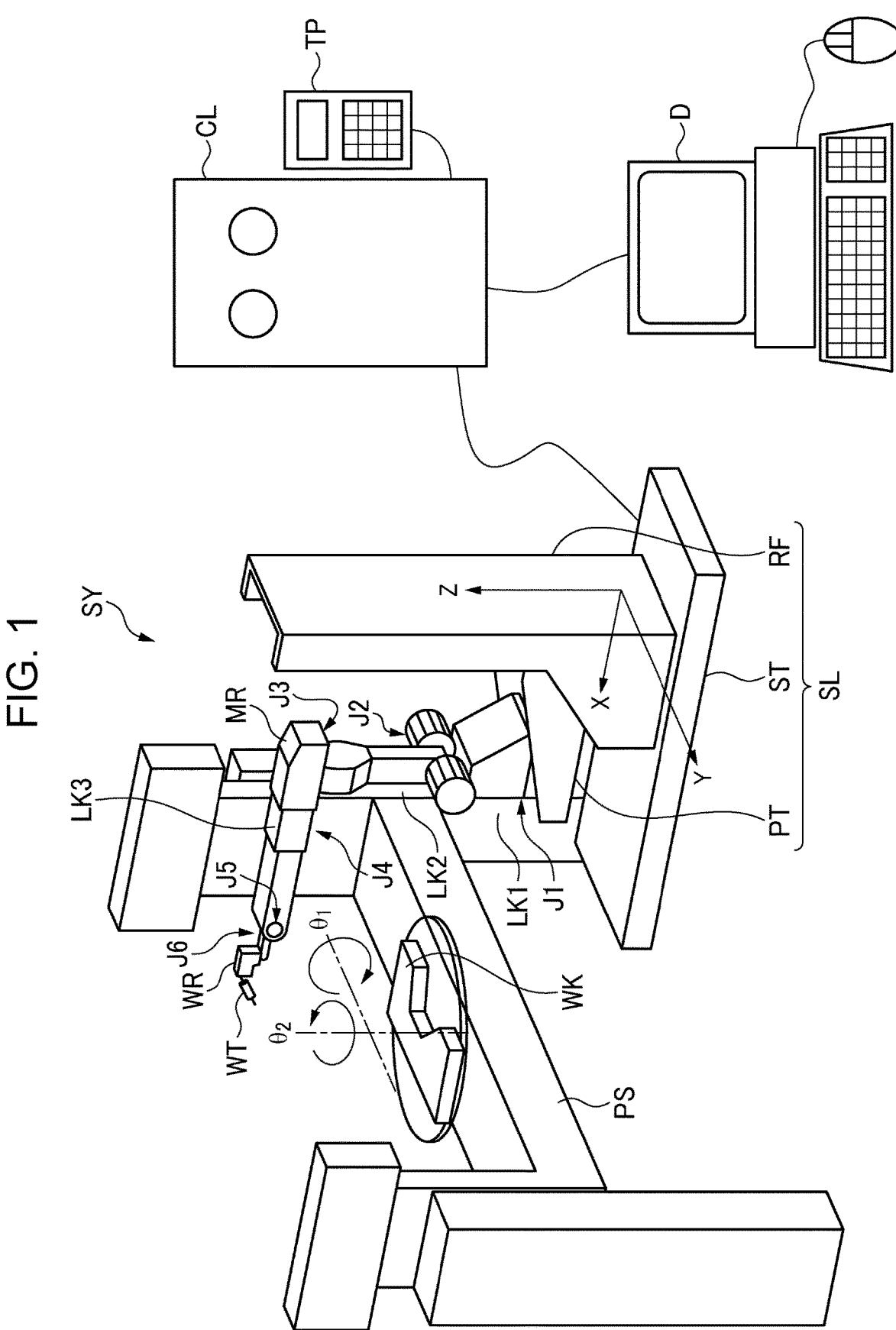
FIG. 1 is a schematic diagram illustrating an overall configuration of a welding system according to an embodiment of the present invention.

Hereinafter, embodiments of the present invention will be described with reference to the drawings and so on. The embodiments described below are example embodiments for explaining the present invention and are not intended to limit the interpretation of the present invention, and all configurations described in the embodiments are not essential to address the issues of the present invention. In the drawings, the same configuration elements are assigned the same reference numerals to indicate correspondences. The configuration of a robot or connections of parts are partially simplified or omitted in the drawings referred to in the following description, which is not intended for limited interpretation.

First Embodiment

In this embodiment, a welding system will be described as an example of a system to which the present invention is applicable. However, the present invention is applicable not only to the welding system but also to a robot system that includes a robot having an arm movable on a plurality of axes, such as six axes, and that is configured to set a motion trajectory of the robot in order to adjust the position of the distal end part of the arm in accordance with predetermined work. The system according to this embodiment need not include specific apparatuses and may include at least apparatuses having functions according to this embodiment. This embodiment assumes that the trajectory of a motion (hereinafter also referred to as "trajectory" or "motion trajectory") includes the pose of each of the parts that constitute the robot and a series of motions for the pose.

Example Configuration of System

FIG. 1 is a schematic diagram illustrating an overall configuration of the welding system according to this embodiment. A welding system SY according to this embodiment includes a robot MR, a mobile platform SL, a positioner PS, a control apparatus CL, a teaching pendant TP, and a motion data generation apparatus D. The configuration illustrated in FIG. 1 is an example and, for example, the welding system according to this embodiment may further include a power supply apparatus that supplies power for welding, a wire feeding apparatus that feeds a wire to the robot MR, an image capturing apparatus that captures images of a weld spot and its surroundings, and sensors for detecting various types of information, which are not illustrated.

The mobile platform SL is an apparatus that slides and moves with the robot MR that carries out predetermined work on a workpiece WK mounted thereon. Providing the mobile platform SL allows welding over a space wider the motion space of an arm of the robot. The mobile platform SL is connected to the control apparatus CL and moves in accordance with control by the control apparatus CL. This embodiment is about the welding system SY, and therefore, the predetermined work carried out on the workpiece WK is arc welding, and a tool provided at the distal end part of the robot MR is a welding torch WT. As illustrated in FIG. 1, the mobile platform SL is movable relative to the workpiece WK in the directions of three axes, namely, an X axis in the front-back direction, a Y axis in the right-left direction, and a Z axis in the up-down direction. The X axis, the Y axis, and the Z axis are orthogonal to each other and define an XYZ rectangular coordinate system (world coordinate system). Although the XYZ rectangular coordinate system overlaps the mobile platform SL in FIG. 1 in order to indicate directions in which the mobile platform SL is movable, the origin of the XYZ rectangular coordinate system may be set so as to coincide with, for example, a workpiece origin that is set at a predetermined position of the workpiece WK. The workpiece origin will be described below. Note that three-dimensional coordinate axes including an X axis, a Y axis, and a Z axis in the drawings referred to in the following description correspond to the X axis, the Y axis, and the Z axis described above respectively.

In the example illustrated in FIG. 1, the mobile platform SL includes a base part ST, a lifting part RF, and a mounting base PT. The base part ST is movable in the X-axis direction and the Y-axis direction. The lifting part RF is installed on the base part ST, raises and lowers the mounting base PT in the Z-axis direction, extends in the Z-axis direction, and has a substantially angular U-shaped cross section when viewed in the Z-axis direction. The mounting base PT is a board on which the robot MR is mounted.

The robot MR is connected to the control apparatus CL and moves in accordance with control by the control apparatus CL. The robot MR includes an arm having a plurality of joints and is, for example, a multi-joint robot, such as a 6-degree-of-freedom vertical 6-axis robot including six joints, namely, a first joint J1 to a sixth joint J6. In the example illustrated in FIG. 1, the robot MR includes a first link LK1 provided with the first joint J1, a second link LK2 connected to the first link LK1 by the second joint J2, a third link LK3 provided with the fourth joint J4 and the fifth joint J5 and connected to the second link LK2 by the third joint J3, and an end effector WR connected to the third link LK3 by the sixth joint J6. The arm of the robot MR is constituted by the first link LK1 to the third link LK3 and the first joint J1 to the sixth joint J6. At the distal end of the end effector WR, the welding torch WT is provided in this embodiment. The robot MR is configured so as to be capable of welding the workpiece WK by arc welding with a welding wire fed from the welding torch WT.

The positioner PS is an apparatus that grips the workpiece WK so as to be rotatable about two axes, namely, the Y axis and the Z axis, by $\theta_1$ and $\theta_2$. The positioner PS is connected to the control apparatus CL and moves in accordance with control by the control apparatus CL. Although the robot MR and the positioner PS are connected to the same control apparatus, namely, the control apparatus CL, in this embodiment, the robot MR and the positioner PS need not be configured as describe above, and may be controlled by separate control apparatuses and perform welding by the separate control apparatuses cooperating with each other. The positioner PS need not be configured as described above and may be configured differently depending on, for example, the form of a work target, namely, the workpiece WK.

The teaching pendant TP is a handy manipulation apparatus that is connected to the control apparatus CL and that is used to manually manipulate the mobile platform SL and the robot MR. In teaching for motions of the mobile platform SL and the robot MR by using the teaching pendant TP, the mobile platform SL and the robot MR are actually moved by a manual manipulation. Accordingly, for example, the movement path and position of the mobile platform SL and the movement path and position of the welding torch WT relative to the workpiece WK are taught. The teaching pendant TP may include buttons and a display screen for performing various manipulations in the welding system SY.

The control apparatus CL controls the mobile platform SL and the robot MR in accordance with motion data taught in advance by the teaching pendant TP or created in advance by the motion data generation apparatus D and makes the welding torch WT perform welding on the workpiece WK. This embodiment assumes that the motion data includes teaching data generated by teaching and a motion program for moving the robot MR and the mobile platform SL on the basis of, for example, the teaching data.

The motion data generation apparatus D is an apparatus that creates motion data (motion program and teaching data) for moving the mobile platform SL and the robot MR in accordance with the purpose of motion. The motion data generation apparatus D is an apparatus that includes at least a motion trajectory generation apparatus capable of performing a motion trajectory generation method according to this embodiment and is, for example, a personal computer (PC). To create motion data, the motion data generation apparatus D reproduces the mobile platform SL and the robot MR as a mobile platform model and a virtual robot model in a virtual space of the computer and makes the models simulate motions of the mobile platform SL and the robot MR. First, a plurality of weld points (a plurality of work positions in a time-series sequence) on the workpiece WK are set, and concatenated weld lines each connecting corresponding ones of the weld points sequentially are set. Based on the weld points and the weld lines, motion data for welding is created. When the position of the robot MR is determined, the position of the mobile platform SL is also determined, and therefore, the mobile platform model may be omitted. The motion data created by the motion data generation apparatus D is stored in a storage unit 202, is loaded to the control apparatus CL from the storage unit 202, and is used. Note that the motion data generation apparatus D may be integrated into the control apparatus CL.

Figure 2:
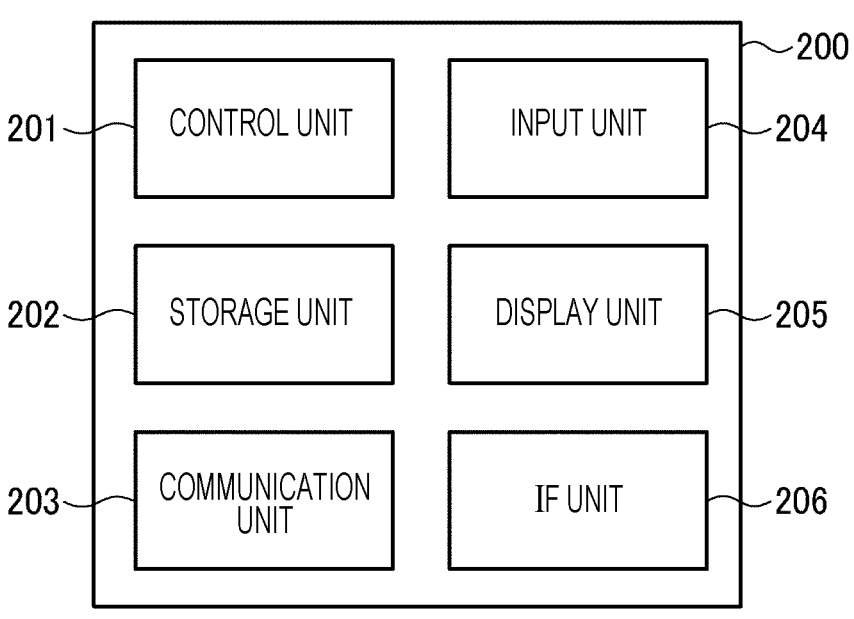
FIG. 2 is a block diagram illustrating an overall configuration of an information processing apparatus according to the embodiment of the present invention.

FIG. 2 is a block diagram illustrating an overall configuration of an information processing apparatus 200 that can be used as the motion data generation apparatus D according to this embodiment. That is, the information processing apparatus 200 is configured so as to be usable as the motion trajectory generation apparatus according to this embodiment. The information processing apparatus 200 includes a control unit 201, the storage unit 202, a communication unit 203, an input unit 204, a display unit 205, and an interface (IF) unit 206.

The control unit 201 may be constituted by, for example, at least one of a central processing unit (CPU), a graphical processing unit (GPU), a micro-processing unit (MPU), a digital signal processor (DSP), or a field-programmable gate array (FPGA). The storage unit 202 may be constituted by, for example, volatile and nonvolatile storage devices, such as a hard disk drive (HDD), a read-only memory (ROM), and a random access memory (RAM). The control unit 201 reads and executes various programs stored in the storage unit 202 to thereby implement various functions described below.

The communication unit 203 is a unit that communicates with external apparatuses and various sensors. The communication unit 203 may communicate by wire or wirelessly on the basis of a communication standard that is not limited to a specific one. The input unit 204 is an input device for inputting various types of information to the information processing apparatus 200 and may be constituted by, for example, a plurality of input switches assigned predetermined functions, a keyboard, and a mouse. The input unit 204 may be used to input, for example, various commands including a command for giving an instruction for starting teaching, and various types of data, such as the name of motion data and collision area information, necessary for operating the welding system SY.

The display unit 205 is a display device for displaying various types of information and may be for example, a CRT display, a liquid crystal display (LCD), or an organic electroluminescence (EL) display. On the display unit 205, for example, a command or data input by using the input unit 204, and the mobile platform model, the virtual robot model, and so on in the virtual space generated by the information processing apparatus 200 may be displayed. Note that the input unit 204 and the display unit 205 may be integrated into a touch panel display.

The IF unit 206 is a unit that is connected to an external apparatus (for example, the control apparatus CL) and that is used to transmit and receive data to and from the external apparatus. The IF unit 206 may be, for example, a serial-communication interface circuit, such as an RS-232C interface circuit, or an interface circuit conforming to the Universal Serial Bus (USB) standard. These units in the information processing apparatus 200 are connected to each other by, for example, an internal bus so as to be capable of communicating with each other.

Pose

A pose of the welding torch WT, a pose of the robot MR, and a pose set by the positioner PS in the welding system SY of this embodiment will be described.

Figure 3:
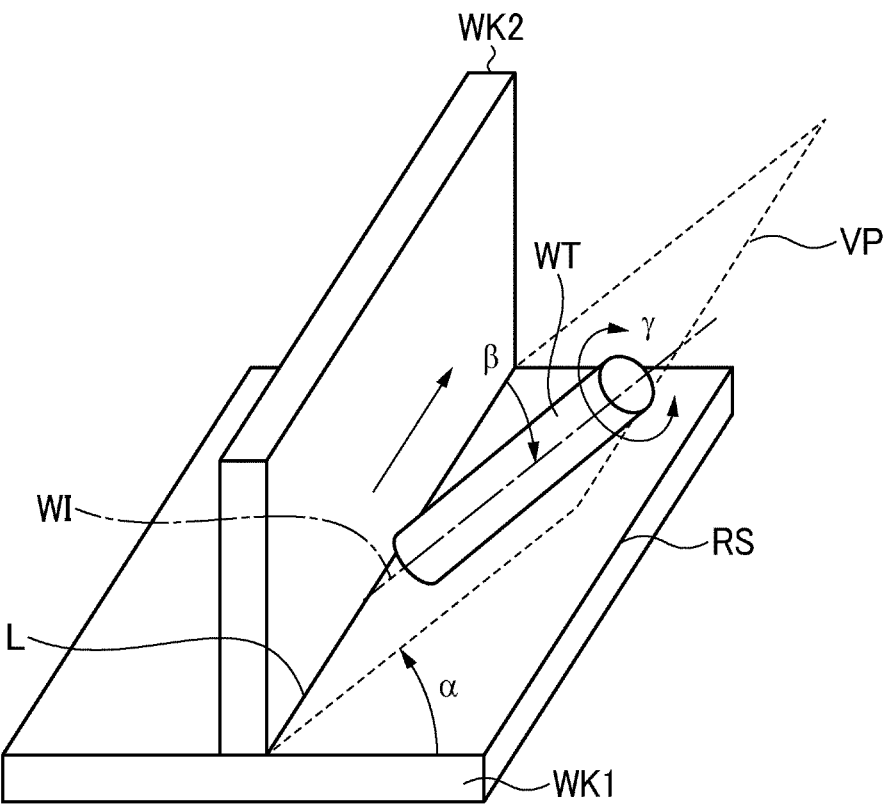
FIG. 3 is a schematic diagram for explaining a welding pose according to the embodiment of the present invention.

FIG. 3 is a diagram for explaining a pose of the welding torch WT in the welding system SY of this embodiment. FIG. 3 illustrates an example where a workpiece WK2 is placed at right angles to a surface (hereinafter referred to as "reference surface RS") of a workpiece WK1. Along a location in which the workpiece WK1 and the workpiece WK2 come into contact with each other, a weld line L is set, and welding is performed in a welding direction, which is a work direction, along the weld line L. The weld line L includes a plurality of weld points, that is, a plurality of work points. Here, an angle made by the reference surface RS of the workpiece WK1 and the welding torch WT is indicated as a torch angle $\alpha$. On a plane (hereinafter referred to as "virtual plane VP") rotated about the weld line L from the reference surface RS of the workpiece WK1 by the torch angle $\alpha$, an angle made by the weld line L and the welding torch WT is indicated as a torch travel angle $\beta$ of the welding torch WT. Here, the axis of the welding torch WT is positioned on the virtual plane VP. An angle of rotation of the welding torch WT about its axis is indicated as a torch rotation angle $\gamma$. Although it is assumed that reference positions for the respective angles, $\alpha$, $\beta$, and $\gamma$ are specified in advance, the reference positions are not limited to specific positions.

Figure 4:
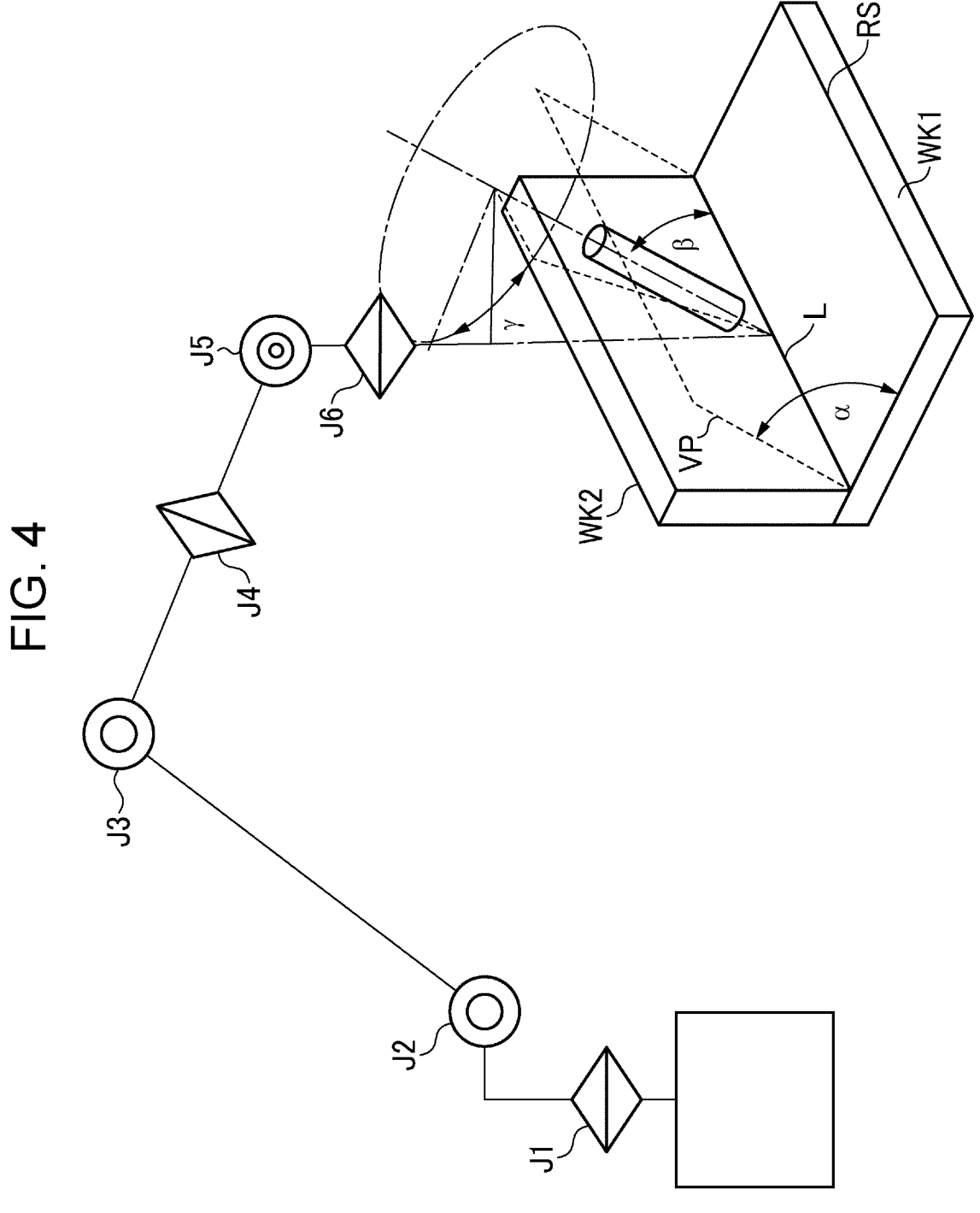
FIG. 4 is a schematic diagram for explaining a pose of a robot according to the embodiment of the present invention.

FIG. 4 is a diagram for explaining a pose of the robot MR in the welding system SY of this embodiment. FIG. 4 illustrates an example robot having six joints, namely, the first joint J1 to the sixth joint J6, as described above. $\alpha$, $\beta$, and $\gamma$ are as indicated in FIG. 3. In this embodiment, one point at which the rotation axes of the fourth joint J4, the fifth joint J5, and the sixth joint J6 intersect is assumed to be the wrist rotation center of the robot MR, which corresponds to the position of the fifth joint J5 in this example. To determine a pose of the robot MR, three angles of $\alpha$, $\beta$, and $\gamma$ are necessary. In a case of welding, the direction of the welding torch WT needs to be determined, and therefore, $\gamma$ is set to any value. Therefore, the value of $\gamma$ can be changed to thereby change the pose and motion space of the robot MR to a target position.

Figure 5A:
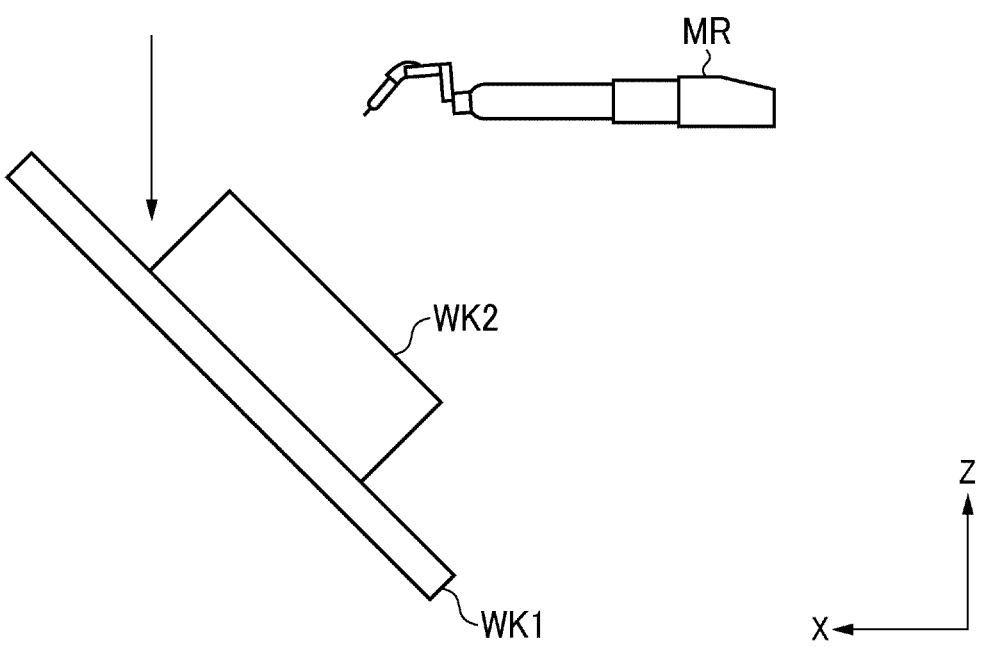
FIG. 5A is an explanatory diagram for explaining a pose of a positioner according to the embodiment of the present invention.
Figure 5B:
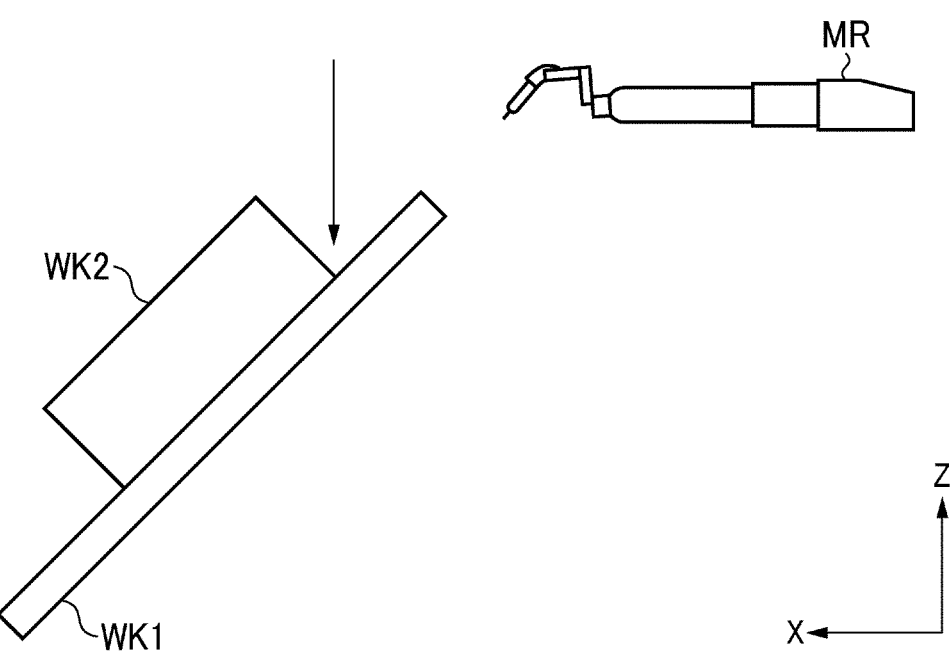
FIG. 5B is an explanatory diagram for explaining a pose of the positioner according to the embodiment of the present invention.

FIG. 5A and FIG. 5B are diagrams for explaining a pose of the workpiece WK set by the positioner PS gripping the workpiece WK as illustrated in FIG. 1. FIG. 5A and FIG. 5B illustrate examples where the welding torch WT is in a horizontal pose and oriented downward. In FIG. 5A and FIG. 5B, the position of a target weld line is indicated by an arrow. As illustrated in FIG. 1, the positioner PS can rotate the workpiece WK about the X axis and the Z axis by the rotation angles $\theta_1$ and $\theta_2$ and can adjust the pose of the workpiece WK relative to the robot MR. Therefore, when the welding torch WT is in a horizontal pose and oriented downward, for example, two poses illustrated in FIG. 5A and FIG. 5B can be used.

Figure 6A:
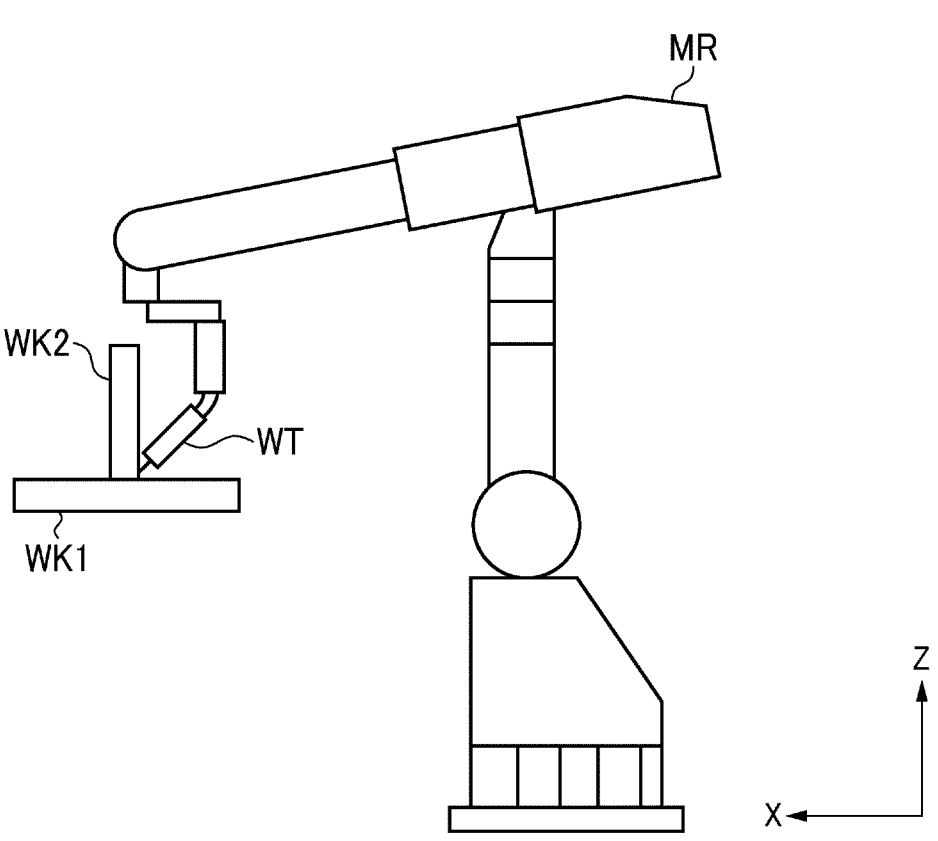
FIG. 6A is an explanatory diagram for explaining an angle of a torch according to the embodiment of the present invention.
Figure 6B:
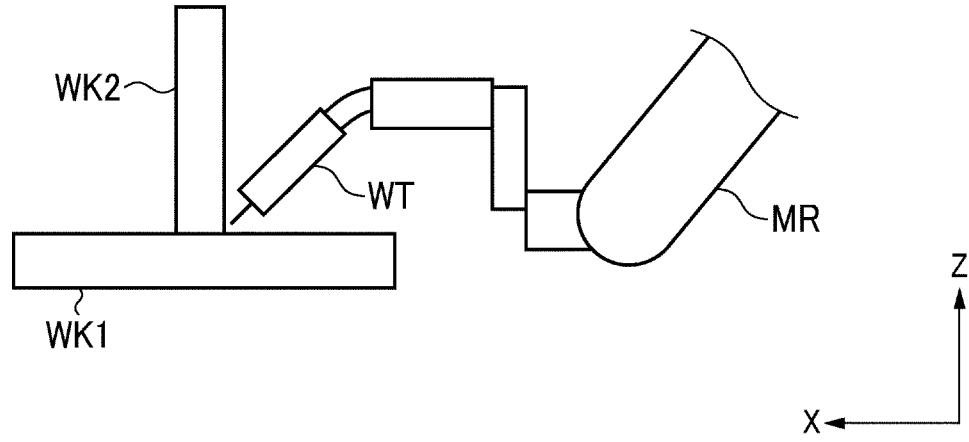
FIG. 6B is an explanatory diagram for explaining an angle of the torch according to the embodiment of the present invention.
Figure 6C:
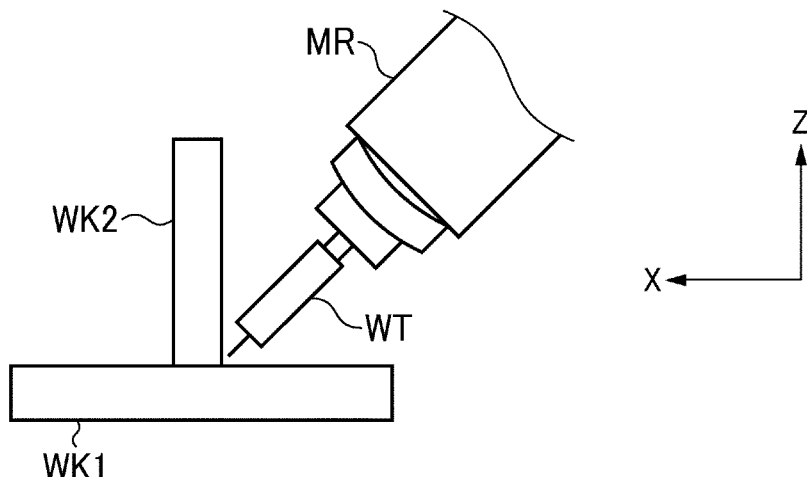
FIG. 6C is an explanatory diagram for explaining an angle of the torch according to the embodiment of the present invention.
Figure 6D:
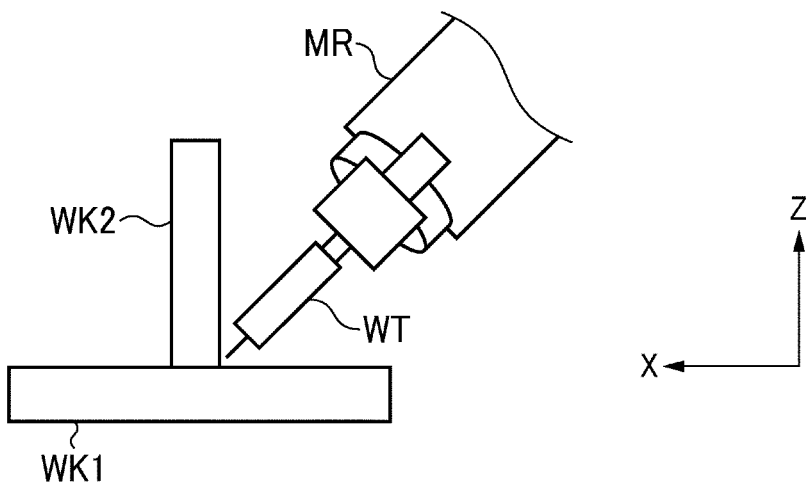
FIG. 6D is an explanatory diagram for explaining an angle of the torch according to the embodiment of the present invention.

FIG. 6A to FIG. 6D are diagrams illustrating four example representative poses of the welding torch WT. The welding torch WT can have various poses by rotation about the wrist rotation center of the robot MR and an adjustment of the torch rotation angle $\gamma$, and the four example poses will be described in this embodiment. In FIG. 6A to FIG. 6D, a direction from the near side toward the far side of the drawings is assumed to be the welding direction. FIG. 6A illustrates a pose (wrist-above pose) in which the wrist of the robot MR described with reference to FIG. 4 is positioned above the welding torch WT. FIG. 6B illustrates a pose (wrist-below pose) in which the wrist of the robot MR is positioned below the welding torch WT. FIG. 6C illustrates a pose (wrist-front pose) in which the wrist of the robot MR is positioned on the front side in the welding direction. FIG. 6D illustrates a pose (wrist-back pose) in which the wrist of the robot MR is positioned on the back side in the welding direction. In the wrist-above pose in FIG. 6A, $\gamma=-90°$ is set. In the wrist-below pose in FIG. 6B, $\gamma=90°$ is set. In the wrist-front pose in FIG. 6C, $\gamma=180°$ is set. In the wrist-back pose in FIG. 6D, $\gamma=0°$ is set.

Now, a flow of determination of a pose and its motion trajectory of the robot MR according to this embodiment will be described. The flow of determination described below is performed by the information processing apparatus 200 in the virtual space corresponding to the mobile platform SL and the robot MR.

First, the information processing apparatus 200 obtains as an arm approach direction, a direction of the arm of the robot MR so as not to overlap a collision area around the workpiece WK, while fixing the wrist rotation center point of the robot MR fixed when the welding torch WT is in a pose corresponding to a predetermined welding position. The wrist rotation center point is one point at which the fourth rotation axis of the fourth joint J4, the fifth rotation axis of the fifth joint J5, and the sixth rotation axis of the sixth joint J6 intersect as described with reference to FIG. 4.

The collision area is an area in a predetermined surrounding environment in which the robot MR collides and may be specified as collision area information. When the collision area is a polyhedron, collision area information may include the coordinates of bending points on the contours of the collision area, and when the collision area is a sphere, collision area information may include the coordinates of the center point and the radius of the sphere that is the collision area. More specifically, the collision area is represented by a three-dimensional model that imitates obstacles including devices, such as a control panel and so on, and accessories, such as a mounting base and so on, disposed in the surrounding environment of the robot MR. The collision area information is information indicating the three-dimensional model. The collision area information may include an area in which the mobile platform SL collides and an area in which other configuration elements of the welding system SY collides in the predetermined surrounding environment, in addition to the area in which the robot MR collides.

Figure 7:
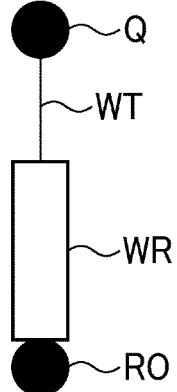
FIG. 7 is an explanatory diagram for explaining determination of the position and pose of the distal end of an arm according to the embodiment of the present invention.
Figure 7:
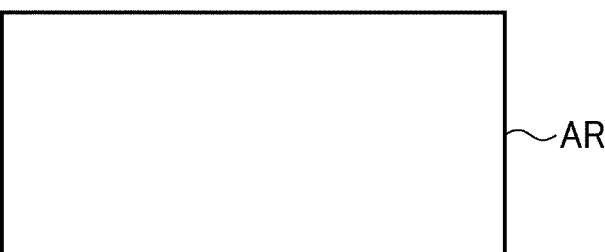

More specifically, as illustrated in FIG. 7, the information processing apparatus 200 determines the position and pose of the welding torch WT relative to a predetermined weld point Q on the basis of work information stored in advance in the storage unit 202. The weld point Q is an example of a predetermined work position. The work information includes welding conditions and the pose of the welding torch WT relative to the groove of the weld line. For example, the position of the welding torch WT is identified in accordance with, for example, the position and pose of the positioner PS illustrated in FIG. 5A or FIG. 5B and the position and direction of the weld line on the workpiece WK. In FIG. 7, the wrist rotation center point RO corresponds to one point at which the rotation axes of the fourth joint J4, fifth joint J5, and sixth joint J6 of the robot MR intersect as described above and indicates a fixed position.

Figure 8:
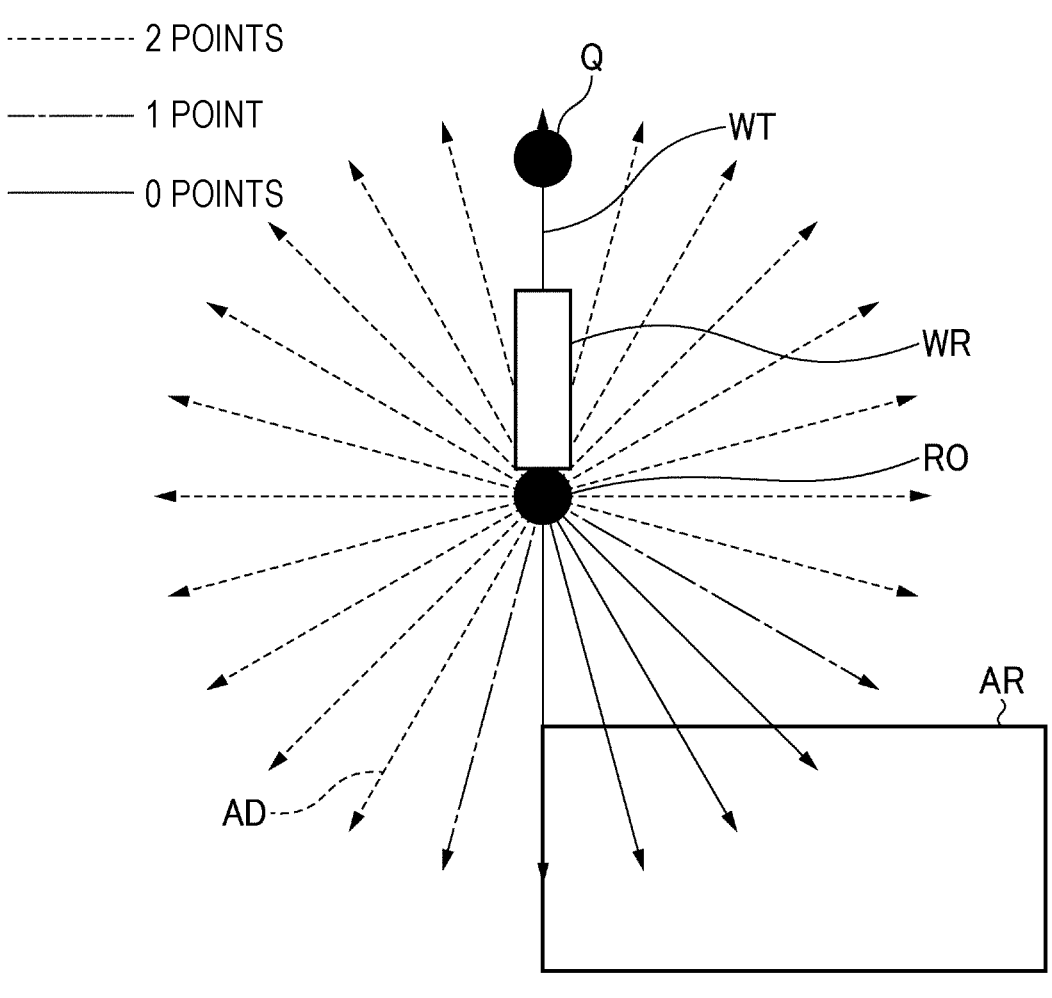
FIG. 8 is an explanatory diagram for explaining a search for approach directions of the arm according to the embodiment of the present invention.
Figure 8:

Next, the information processing apparatus 200 searches for possible arm approach directions of the robot-hand in which the arm of the robot MR can approach so as not to overlap the collision area in the surrounding environment of the robot MR. In more detail, as illustrated in FIG. 8, the information processing apparatus 200 sets a collision area AR indicated by collision area information, which is stored in the storage unit 202, in the surrounding environment of the robot MR and searches a plane (for example, a horizontal plane) that includes the wrist rotation center point RO fixed when the position and pose of the welding torch WT are set as described above, for directions that are set at predetermined angular intervals (for example, intervals of 5°, 10°, 15°, or 20°) in the circumferential direction of a circle centered around the wrist rotation center point RO, which is the center point, and that do not overlap the set collision area AR, as possible arm approach directions of the robot-hand. FIG. 8 illustrates an example of 24 directions in total, that is, an example of the angular intervals of 15°. The angular intervals may be set in advance or may be set by the user of the welding system SY as desired. Here, it is desirable to take into consideration the thickness and size of the arm of the robot MR. The size and so on of the arm are taken into consideration by, for example, making the center line of the arm (the third link LK3) of the robot MR coincide with each of the possible arm approach directions of the robot-hand. In the example illustrated in FIG. 8, directions (the directions of solid-line arrows) that overlap the collision area AR are evaluated as 0 points, directions (represented by dashed dotted lines) that do not overlap the collision area AR but overlap the collision area AR when the size of the arm is taken into consideration are evaluated as 1 point, and directions (represented by dashed lines) that do not overlap the collision area AR and do not overlap the collision area AR even when the size of the arm is taken into consideration are evaluated as 2 points. In this embodiment, among the total of 24 directions, the total of 18 directions that are evaluated as 2 points are extracted as possible arm approach directions of the robot-hand.

Figure 9:
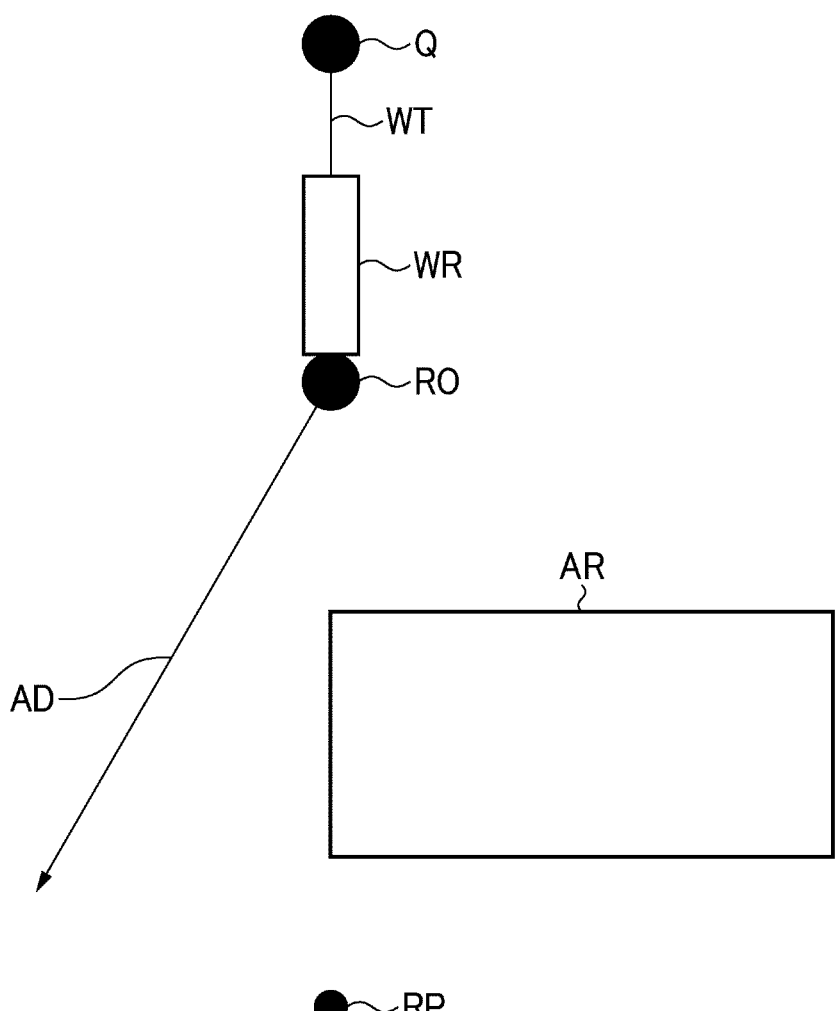
FIG. 9 is an explanatory diagram for explaining determination of an approach direction of the arm according to the embodiment of the present invention.
Figure 10:
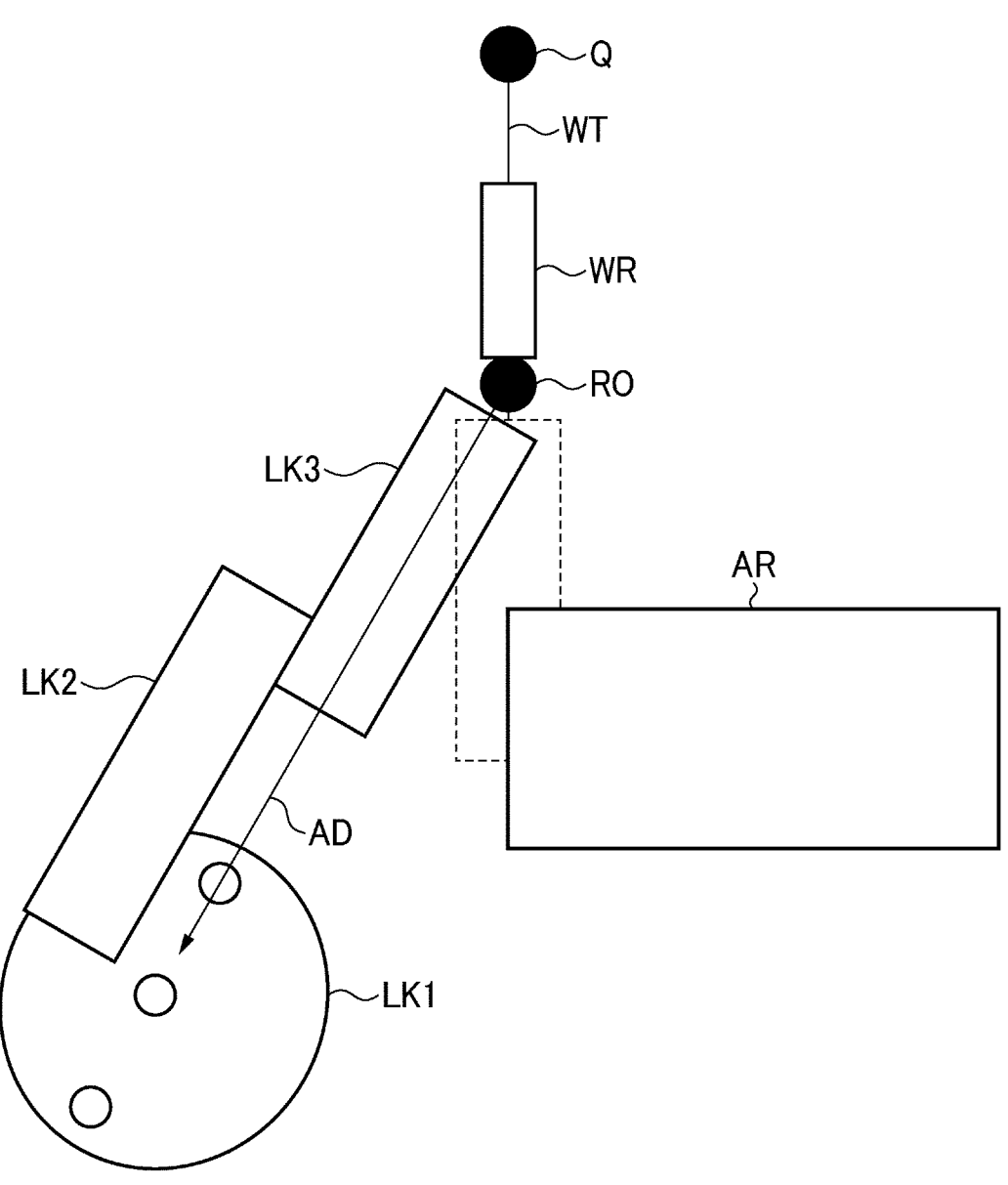
FIG. 10 is an explanatory diagram for explaining determination of an approach direction of the arm according to the embodiment of the present invention.

Next, the information processing apparatus 200 selects and determines one arm approach direction from among the plurality of extracted possible arm approach directions of the robot-hand. In the example illustrated in FIG. 8, one of the 18 possible arm approach directions of the robot-hand is set and determined. To determine one, a predetermined rule is used. The predetermined rule may be set as appropriate and, for example, a rule that one that is closest to a predetermined reference position RP is selected may be used. In welding according to this embodiment, the robot MR usually approaches the weld point Q of the workpiece WK from a position in front of the workpiece WK. Therefore, in this embodiment, the predetermined reference position RP corresponds to a position in front of the workpiece WK. Accordingly, in the example illustrated in FIG. 8, the information processing apparatus 200 selects and determines from among the plurality of possible arm approach directions of the robot-hand, one possible arm approach direction of the robot-hand closest to the reference position RP as an arm approach direction AD as illustrated in FIG. 9. Accordingly, the arm approach direction AD of the arm of the robot MR when viewed from above is obtained. FIG. 10 illustrates a state in which the robot MR is disposed such that the arm of the robot MR is in the arm approach direction AD thus determined. To be exact, the robot MR described here is the virtual robot model.

Next, the information processing apparatus 200 obtains the position of the mobile platform SL on the basis of the determined arm approach direction AD. As described above, when the position of the robot MR is determined, the position of the mobile platform SL is determined. Therefore, the information processing apparatus 200 obtains the position of the robot MR on the basis of the determined arm approach direction AD to thereby obtain the position of the mobile platform SL. The position of the robot MR based on the arm approach direction AD may be obtained by using a publicly known method.

Figure 11:
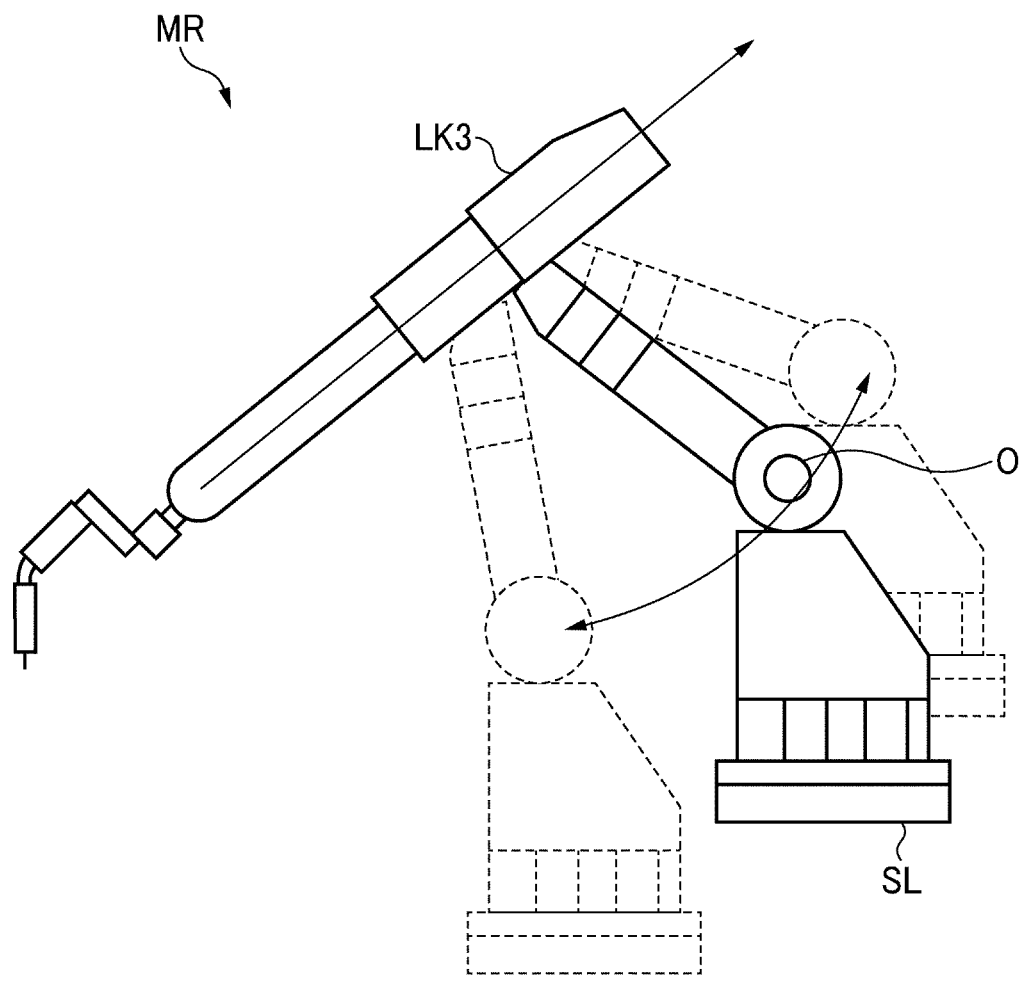
FIG. 11 is an explanatory diagram for explaining a search for the position of a robot origin in a circumferential direction according to the embodiment of the present invention.
Figure 12:
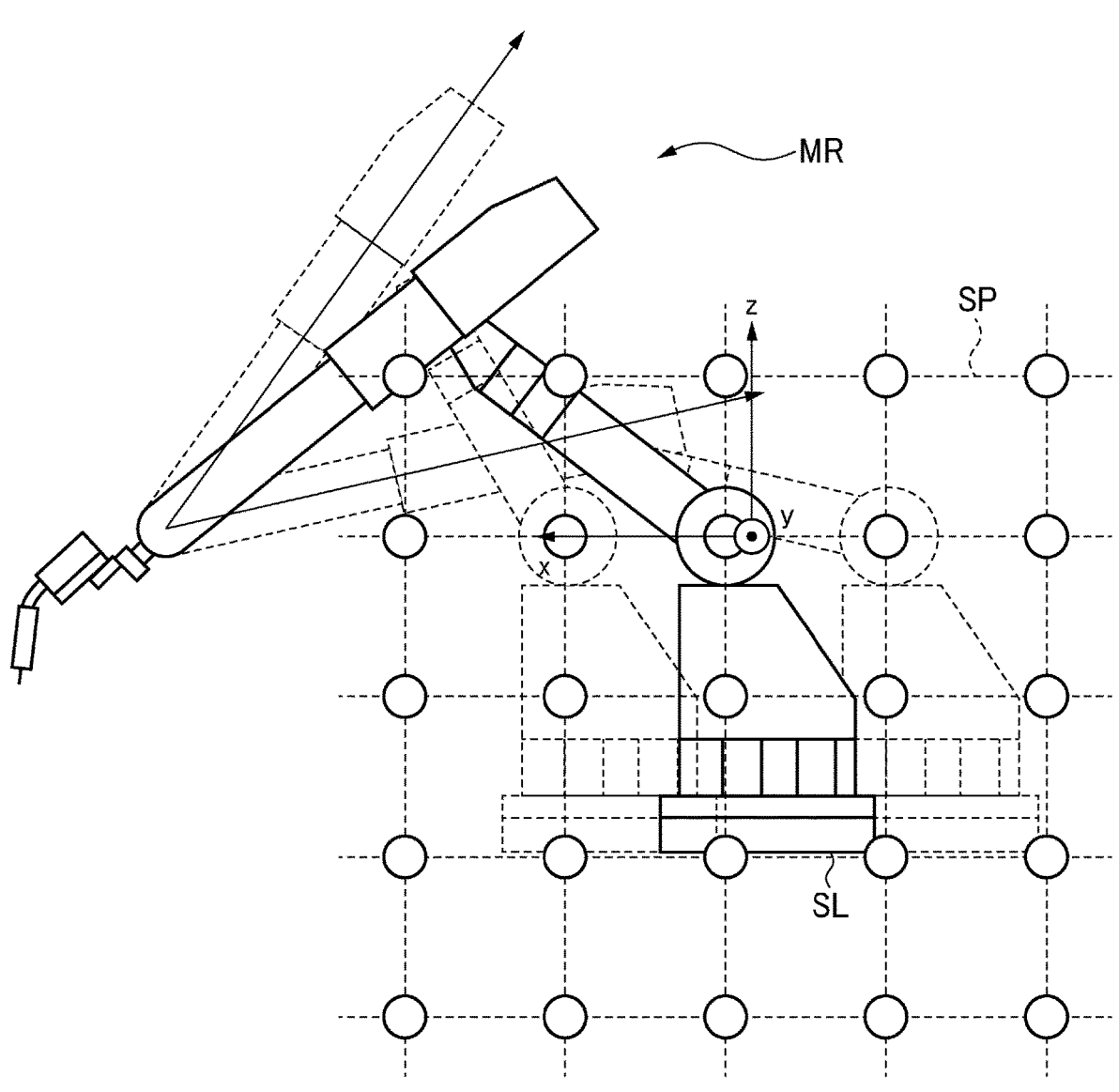
FIG. 12 is an explanatory diagram for explaining a search plane and lattice points according to the embodiment of the present invention.

Examples of the method for determining the position of the mobile platform SL include two methods as illustrated in FIG. 11 and FIG. 12. The two methods described below are not exclusive, and may be combined or selectively used.

FIG. 11 is a diagram for explaining a case of a search for the position of the robot origin in the circumferential direction of a circle centered around the position of the third joint of the robot MR, which is the center point, in a search plane. FIG. 11 is a diagram of the robot MR when viewed from a side along the Y axis. In this case, the information processing apparatus 200 sets the position of the mobile platform SL such that in a search plane that includes the obtained arm approach direction AD, the robot origin O coincides with each of a plurality of points set in the circumferential direction of a circle centered around the position of the third joint J3, which is the center point. The information processing apparatus 200 calculates an evaluation value for each of the points corresponding to a corresponding position of the mobile platform SL and obtains the position of the mobile platform SL on the basis of the evaluation values.

More specifically, the information processing apparatus 200 sets a circle having the position of the third joint J3 as its center point and having a radius equal to the distance from the position of the third joint J3 to the robot origin O (a distance determined in accordance with the length of the second link LK2) in the search plane that includes the obtained arm approach direction AD and sets a plurality of points on the circumference of the set circle. For each point of the plurality of points, the information processing apparatus 200 obtains a position of the mobile platform SL such that the point coincides with the robot origin O, and obtains positions of the mobile platform SL that are within the motion space of the mobile platform SL excluding the collision area and from which an inverse transformation for determining the pose of the robot MR can be performed, as candidate positions. The information processing apparatus 200 obtains an evaluation value for each of the points corresponding to the respective obtained candidate positions. The evaluation value may be obtained by using an evaluation function that includes any of, for example, a margin from a specific pose of the robot MR, a margin from the motion space boundary of each axis, the degree of collision or a near miss in the surrounding environment or with the workpiece WK in the pose of the robot MR, a margin from the motion space boundary of each axis of the mobile platform SL, or the amount of movement from the previous position of each axis of the mobile platform SL when a plurality of work positions Qi (i=1, 2, . . . ) are present in a time-series sequence. The information processing apparatus 200 extracts a point having an evaluation value that is greater than or equal to a predetermined threshold set in advance and that is highest among the evaluation values for the respective points and determines a candidate position corresponding to the extracted point as the position of the mobile platform SL.

FIG. 12 is a diagram for explaining a case of a search for the position of the mobile platform SL in a search plane, within a predetermined range including the determined arm approach direction. Similarly to FIG. 11, FIG. 12 is a diagram of the robot MR when viewed from a side along the Y axis. In this case, the information processing apparatus 200 sets a search plane SP that includes the determined arm approach direction and in which the robot origin O, which is the motion base point of the robot MR, is positioned in the arm approach direction AD. The information processing apparatus 200 sets the position of the mobile platform SL such that the robot origin O coincides with each of a plurality of lattice points set in the search plane SP. The information processing apparatus 200 calculates an evaluation value for each of the lattice points corresponding to a corresponding position of the mobile platform SL and obtains the position of the mobile platform SL on the basis of the evaluation values. Note that the pose of the positioner PS is set as appropriate as described with reference to FIG. 5A or FIG. 5B.

More specifically, for example, the information processing apparatus 200 obtains a motion space of the robot MR in the search plane SP that includes the determined arm approach direction AD, that passes through the robot origin O, which is the motion base point of the robot MR, and that includes the distal end part of the robot MR (the distal end part of the welding torch WT) as illustrated in FIG. 12. The information processing apparatus 200 sets a plurality of lattice points discretely within the obtained motion space. Therefore, the robot origin O is positioned in the arm approach direction AD. The intervals between the plurality of lattice points are set in advance as appropriate so as to be sufficiently short for a search.

For each lattice point of the plurality of lattice points, the information processing apparatus 200 obtains the position of the mobile platform SL such that the lattice point coincides with the robot origin O, and obtains positions of the mobile platform SL that are within the motion space of the mobile platform SL excluding the collision area and from which an inverse transformation for determining the pose of the robot MR can be performed, as candidate positions. The information processing apparatus 200 obtains an evaluation value for each of the lattice points corresponding to the respective obtained candidate positions. As in the method described with reference to FIG. 11, the evaluation value may be obtained by using an evaluation function that includes any of, for example, a margin from a pose of the robot MR, a margin from the motion space boundary of each axis, the degree of collision or a near miss in the surrounding environment or with the workpiece WK in the pose of the robot MR, a margin from the motion space boundary of each axis of the mobile platform SL, or the amount of movement from the previous position of each axis of the mobile platform SL when the plurality of work positions Qi (i=1, 2, . . . ) are present in a time-series sequence. The information processing apparatus 200 extracts a lattice point having an evaluation value that is greater than or equal to a predetermined threshold set in advance and that is highest among the evaluation values for the respective lattice points and determines a candidate position corresponding to the extracted lattice point as the position of the mobile platform SL.

The xyz rectangular coordinate system having the robot origin O as its coordinate origin illustrated in FIG. 12 is a local coordinate system for expressing the position and pose of the arm from the motion base point of the robot MR. When the position of the mobile platform SL is determined, the XYZ rectangular coordinate system and the xyz rectangular coordinate system are associated with each other.

When the plurality of work positions Qi (i=1, 2, . . . ) in a time-series sequence, that is, a plurality of weld points, are present on the workpiece WK, the information processing apparatus 200 obtains an arm approach direction ADi for each of the plurality of work positions Qi and for each of the weld lines defined by the work positions Qi in the time-series order. Further, the information processing apparatus 200 obtains the position of the mobile platform SL for each of the plurality of obtained arm approach directions ADi. Here, the information processing apparatus 200 obtains the present arm approach direction ADi so as to be closest to the previous arm approach direction ADi−1 in the time-series order.

As illustrated in FIG. 12, when the third link LK3 is movable in the search plane SP with the wrist rotation center point RO being fixed and when the third link LK3 is unable to move or the movement space of the third link LK3 is narrow (small) in spite of a search for the position of the mobile platform SL by using the lattice points in the search plane SP, the position of the mobile platform SL may be searched for with the method described with reference to FIG. 11.

Motion Trajectory Determination Process

Now, a motion trajectory generation process according to this embodiment will be described on the basis of the methods described above. As described above, upon generation of a motion trajectory of the robot MR, a search needs to be carried out by taking into consideration a combination of, for example, the welding position, the welding direction, the torch pose, and the position of the mobile platform SL, and a more appropriate trajectory needs to be generated. More specifically, in a case where the approach direction of the robot MR described with reference to FIG. 10, that is, the arm approach direction AD, is determined, and thereafter, the search process described with reference to FIG. 11 or FIG. 12 is performed, the search process is performed for each of the parameters of the torch rotation angle γ. For example, in a case of the four example poses of the welding torch WT as illustrated in FIG. 6A to FIG. 6D, the search process is performed for each of the four poses. Therefore, as the number of target parameters of the torch rotation angle γ increases, the processing load of the search process increases, that is, the processing time increases. Further, as the number of weld points increases, the processing time further increases.

In this embodiment, in generation of the pose and its trajectory of the robot MR in the welding system SY, a method for performing a process of generating a motion trajectory more efficiently will be described.

In this embodiment, the direction of the weld line described with reference to, for example, FIG. 3 is denoted by φ, and on the basis of this welding direction φ, the torch angle α, and the torch travel angle β, priority levels are set for representative poses that are based on the torch rotation angle γ. This embodiment assumes the four example poses illustrated in FIG. 6A to FIG. 6D to be the representative poses, and a description will be given, however, the representative poses are not limited to the example poses. The search is carried out for the poses sequentially in descending order of priority level, and the trajectory of the robot MR is generated on the basis of the evaluation value of the search result to thereby omit an extra search and shorten the processing time.

Priority Level DB

Figure 13:
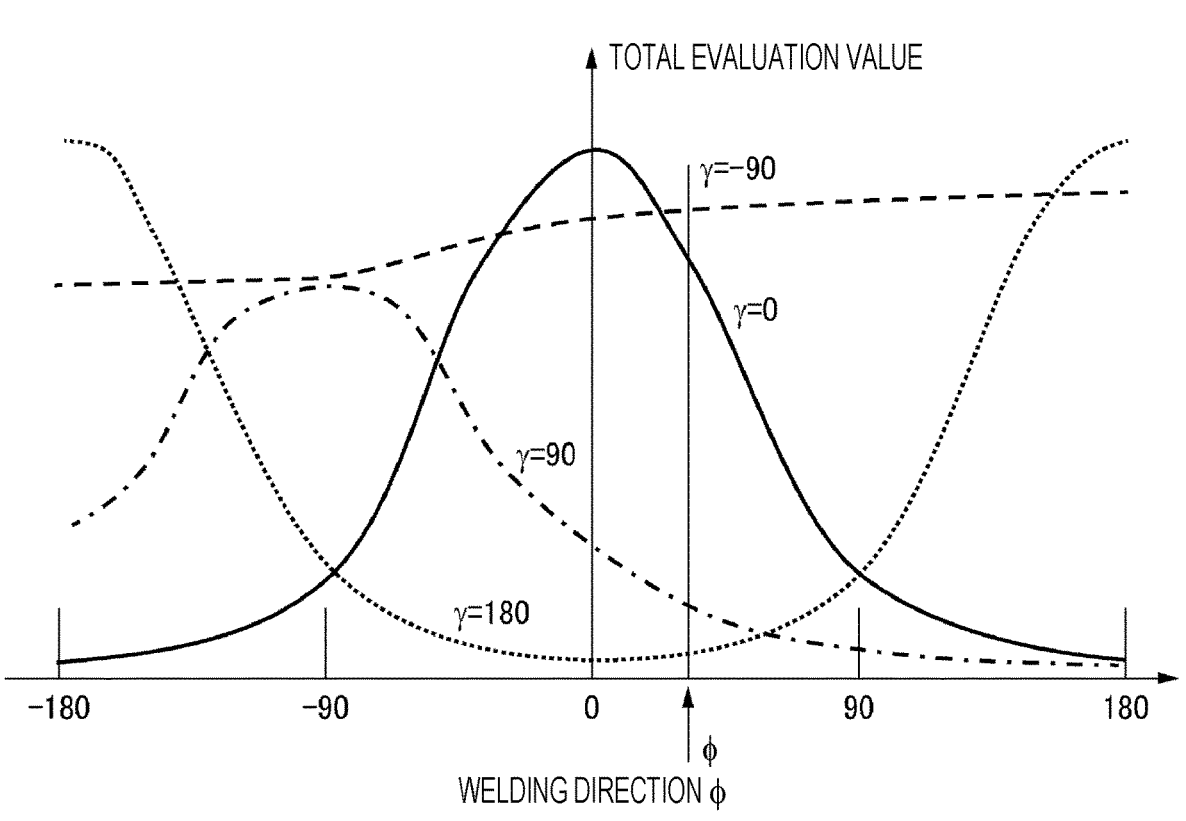
FIG. 13 is a graph for explaining priority levels used in a trajectory search according to the embodiment of the present invention.

In this embodiment a database (hereinafter referred to as "DB") in which priority levels corresponding to the welding direction φ are specified is provided in advance and used. The DB according to this embodiment may be defined by, for example, analyzing and evaluating data of trajectories used in welding performed in the past. FIG. 13 is a graph showing evaluation values for each of the values of the welding direction φ specified in the DB. In FIG. 13, the horizontal axis represents the welding direction φ, and the vertical axis represents the total evaluation value, that is, the adoption rate corresponding to the priority level of the torch rotation angle γ. As described above, the four examples where the torch rotation angle γ is equal to 0, 90, 180, and −90 [° ] are shown.

For example, when the welding direction φ has a value indicated by the arrow in FIG. 13, the total evaluation value decreases in the order of γ=−90, 0, 90, and 180 [° ]. Therefore, the priority level decreases in the order of γ=−90, 0, 90, and 180 [° ], and the order of search is set on the basis of this order of priority level.

A plurality of DBs may be specified in accordance with, for example, the pose of the welding torch WT. For example, DBs may be specified so as to correspond to respective cases where the welding torch WT is in a horizontal pose and oriented downward, is in a horizontal pose and oriented sideways, and in a horizontal pose and oriented upward. Pieces of data of parameters having geometrically equivalent values may be omitted to thereby reduce the size of the DB. For example, when the evaluation values for γ=0 and γ=180 are equal to each other, data of one of the evaluation values may be omitted to thereby set common data.

Figure 14A:
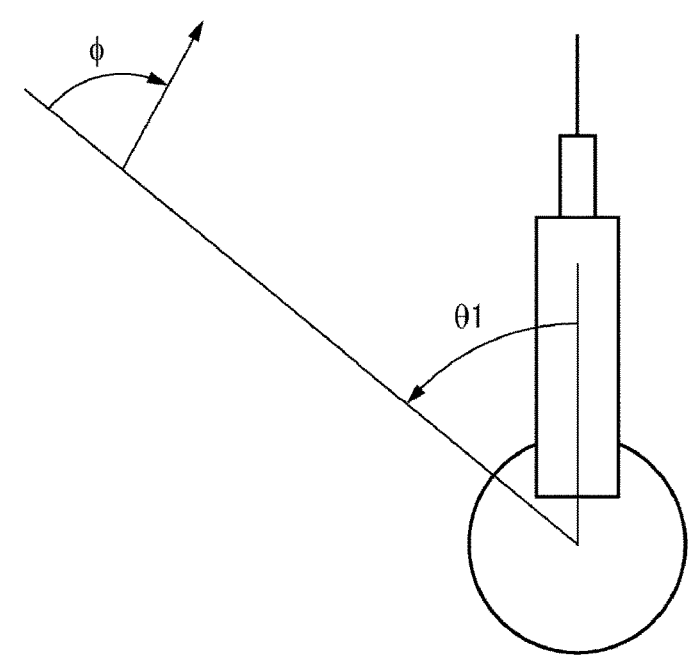
FIG. 14A is a schematic diagram for explaining an adjustment of the angle of the torch according to the embodiment of the present invention.
Figure 14B:
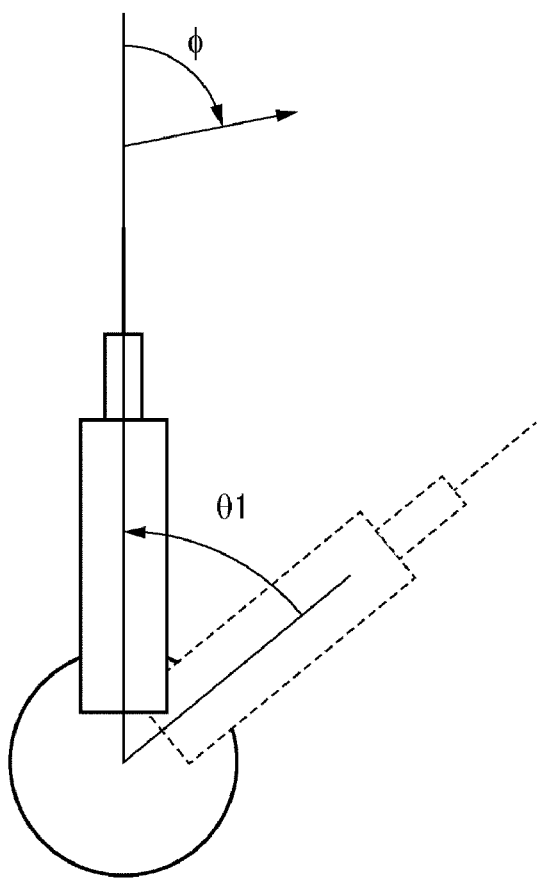
FIG. 14B is a schematic diagram for explaining an adjustment of the angle of the torch according to the embodiment of the present invention.

In a case of welding, as described with reference to, for example, FIG. 9, the robot MR is usually positioned in front of the weld line L (corresponding to the reference position RP). However, the welding torch WT might not be in front of the robot MR as illustrated in FIG. 14A. FIG. 14A illustrates an example case where the welding direction φ is in a location rotated from the front of the robot MR by a rotation angle θ1. In such a case, an existing DB can be used without preparation of a separate DB on condition that a rotation adjustment is made on the basis of the rotation angle θ1 as illustrated in FIG. 14B.

Process Flow

Figure 15:
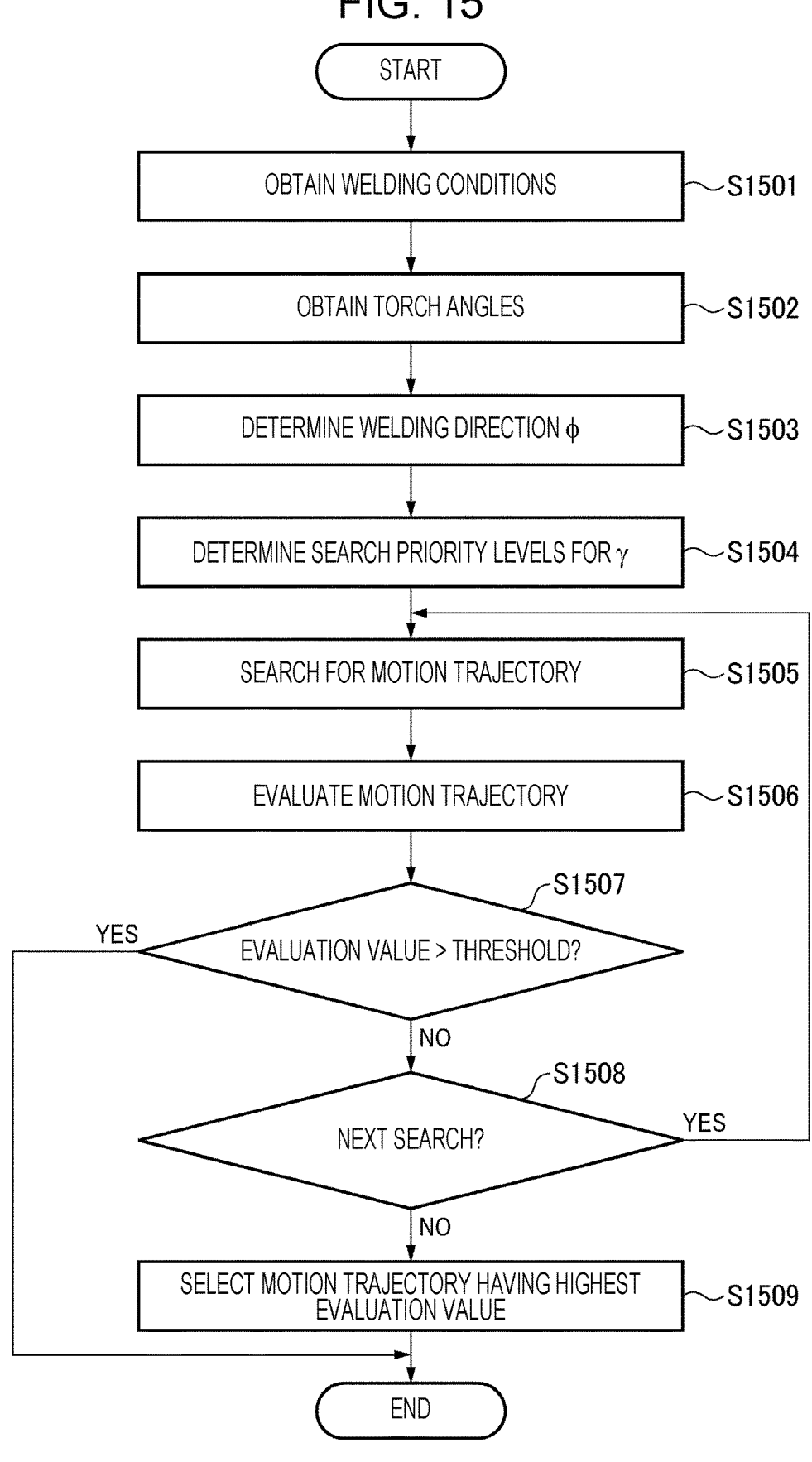
FIG. 15 is a flowchart of a motion trajectory generation process according to the embodiment of the present invention.

Now, a flow of the motion trajectory generation process according to this embodiment will be described. FIG. 15 is a flowchart illustrating the entire flow of the motion trajectory generation process according to this embodiment. Each of the steps is implemented by the units of the information processing apparatus 200 illustrated in FIG. 2 cooperating with each other, and the units may be operated by, for example, the control unit 201 reading and executing an application stored in the storage unit 202 of the information processing apparatus 200. To simplify the description, any processing unit concerned is described as the information processing apparatus 200. It is assumed that work information and collision area information are set in advance before the start of this process flow. It is also assumed that the DB as described with reference to FIG. 13 has been specified.

In step S1501, the information processing apparatus 200 obtains welding conditions for the workpiece WK on the basis of the work information. Examples of the welding conditions obtained here include the pose of the welding torch WT (for example, in a horizontal pose and oriented downward), the position of the weld line, and information about the groove of the weld line. Based on the work information, the pose of the positioner PS as illustrated in FIG. 5A or FIG. 5B, that is, the pose of the workpiece WK, is determined.

In step S1502, the information processing apparatus 200 obtains the torch angle α and the torch travel angle β on the basis of various types of information obtained in step S1501.

In step S1503, the information processing apparatus 200 determines the position of the weld line and the welding direction φ when viewed from the robot MR, on the basis of the pose of the positioner PS and disposition of the workpiece WK identified on the basis of various types of information obtained in step S1501. At this time, the information processing apparatus 200 identifies an approach direction of the robot MR relative to the weld line as described with reference to FIG. 7 to FIG. 10. When an undetermined parameter is present, a provisional value may be used to determine the welding direction φ.

In step S1504, the information processing apparatus 200 identifies a plurality of candidates for the torch rotation angle γ, which are search targets, and determines priority levels for the plurality of candidates for the torch rotation angle γ respectively with reference to the DB described with reference to FIG. 13. In the case of the example illustrated in FIG. 13, the information processing apparatus 200 identifies γ=0, 90, −90, and 180 [° ] as the plurality of candidates for the torch rotation angle γ and determines their priority levels. Note that the plurality of candidates for the torch rotation angle γ may be specified in advance or may be specified by the user of the welding system SY.

In step S1505, the information processing apparatus 200 carries out a search for a motion trajectory for a candidate for which processing is not yet performed and that has the highest priority level among the plurality of candidates for the torch rotation angle γ. This search is carried out with, for example, the method described with reference to FIG. 11 or FIG. 12.

In step S1506, the information processing apparatus 200 evaluates the motion trajectory of the robot MR searched for in step S1505. The method for deriving the evaluation value is not limited to a specific one and may be performed, for example, in two steps including determination as to whether an essential condition is satisfied and evaluation calculation using a predetermined mathematical equation.

Examples of the essential condition include determination as to whether the robot MR collides in the collision area on the trajectory, determination as to whether the trajectory is continuous, determination as to whether the trajectory is included in the motion space, and determination as to whether a forward transformation or an inverse transformation in the coordinate system can be performed in calculation of coordinates. When the essential condition is not satisfied, the trajectory need not be adopted regardless of the evaluation value obtained by evaluation calculation using the predetermined mathematical equation. Alternatively, the trajectory that does not satisfy the essential condition may be considered to require an adjustment to be made by the user of the welding system SY.

In the evaluation calculation using the predetermined mathematical equation, indices may be specified for, for example, winding of a cable (not illustrated) around the robot MR on the trajectory, collision with a cable, the extending state and pose of the arm, displacement of a predetermined axis, and the pose of the welding torch WT, and the evaluation value may be obtained from, for example, the weighted sum of these indices. Winding of a cable may be determined on the basis of, for example, whether the sum of the rotation angles of predetermined axes among the plurality of axes of the robot MR is less than or equal to a predetermined threshold. Collision with a cable may be determined by identifying the radius of curvature of the cable and determining whether the radius of curvature is less than or equal to a predetermined threshold. The indices described above are examples and other indices may be used.

In step S1507, the information processing apparatus 200 determines whether the evaluation value derived in step S1506 is greater than a threshold specified in advance. When the evaluation value is greater than the threshold (YES in step S1507), the information processing apparatus 200 decides to use the trajectory, and the process flow ends. In this case, even when torch rotation angles for which processing is not yet performed are present, the search process for these torch rotation angles is omitted. When the evaluation value is less than or equal to the threshold (NO in step S1507), the process by the information processing apparatus 200 proceeds to step S1508.

In step S1508, the information processing apparatus 200 determines whether a candidate for the torch rotation angle γ for which processing is not yet performed is present. When a candidate for the torch rotation angle γ for which processing is not yet performed is present (YES in step S1508), the process by the information processing apparatus 200 returns to step S1505, and processing is repeated. On the other hand, when a candidate for the torch rotation angle γ for which processing is not yet performed is not present (NO in step S1508), the process by the information processing apparatus 200 proceeds to step S1509.

In step S1509, the information processing apparatus 200 selects and decides to use a motion trajectory having the highest evaluation value among motion trajectories that have been evaluated. On the basis of the selected motion trajectory, motion data of the robot MR, more specifically, teaching data, is generated. Then, the process flow ends.

According to this embodiment, in generation of a motion trajectory related to control of a robot, it is possible to generate an appropriate pose and its series of trajectories of the robot while reducing a processing time taken to generate the motion trajectory.

Other Embodiments

The above-described embodiment describes an example where the DB specified in advance is used to set priority levels. However, such a DB need not be used, and a trained model generated by performing a machine learning process using a neural network may be used to set priority levels for the torch rotation angle γ. In this case, a trained model generated by, for example, performing learning using teacher data that includes a welding position, a welding direction, a torch rotation angle, and so on as input data and priority levels of a plurality of candidates for the torch rotation angle as output data may be used. When a trained model is used, the input data parameters included in the teacher data are not limited to those described above and, for example, any of the various types of information used in the first embodiment may be used.

Instead of the DB, a predetermined rule-based evaluation function may be used to determine priority levels for the torch rotation angle γ. The evaluation function may be specified so as to determine the torch rotation angle γ in accordance with, for example, the values of parameters including a welding position and a welding direction. A result output from the trained model based on machine learning and the rule-based evaluation function may be combined to determine the priority levels of respective candidates for the torch rotation angle γ.

The embodiment can be implemented as a process in which a program or an application for implementing one or more of the above-described functions of the embodiment is supplied to a system or an apparatus via, for example, a network or a storage medium, and one or more processors of the system or the apparatus read and execute the program.

The embodiment may be implemented as a circuit that implements one or more of the functions. Examples of the circuit that implements one or more of the functions include an application-specific integrated circuit (ASIC) and a field-programmable gate array (FPGA).

As described above, the following matters are disclosed herein.

(1) A motion trajectory generation method for generating a motion trajectory of a robot having a plurality of drive axes upon carrying out work at a work position, the motion trajectory generation method including:

an obtaining step of obtaining a motion condition identified and corresponding to the work position; and a generation step of generating a motion trajectory of the robot by carrying out a search for a plurality of motion trajectories that the robot is able to implement, on the basis of the motion condition, in which in the generation step, priority levels in the search are determined on the basis of the motion condition and work directions for a plurality of work positions, and the search for the plurality of motion trajectories is carried out on the basis of the priority levels.

According to this configuration, in generation of a motion trajectory related to control of a robot, it is possible to efficiently generate an appropriate pose and its series of trajectories of the robot while reducing a processing time taken to generate the motion trajectory.

(2) The motion trajectory generation method according to (1), further including:

an evaluation step of evaluating the motion trajectories for which the search has been carried out on the basis of the priority levels, in which when a motion trajectory evaluated as reaching or exceeding a threshold in the evaluation step is derived, the motion trajectory is determined and the search is terminated in the generation step.

According to this configuration, the search process is terminated at the time point when a motion trajectory evaluated as reaching or exceeding the predetermined threshold is derived on the basis of an evaluation method specified in advance, to thereby allow elimination of an extra search and efficient generation of the motion trajectory of the robot.

(3) The motion trajectory generation method according to (1) or (2), in which the priority levels are determined by using a database specified in advance and corresponding to the motion condition.

According to this configuration, it is possible to easily determine priority levels of poses of the robot related to the search, by using the database specified in advance and corresponding to the motion condition of the robot.

(4) The motion trajectory generation method according to (1) or (2), in which the priority levels are determined by using a trained model for which a machine learning process using the motion condition as input and the priority levels in the search as output has been performed.

According to this configuration, it is possible to easily determine priority levels of poses of the robot related to the search, by using the trained model obtained in advance by machine learning and corresponding to the motion condition of the robot.

(5) The motion trajectory generation method according to (1) or (2), in which the priority levels are determined by using an evaluation function that uses the motion condition as a parameter.

According to this configuration, it is possible to easily determine priority levels of poses of the robot related to the search, by using the evaluation function specified in advance and corresponding to the motion condition of the robot.

(6) The motion trajectory generation method according to any of (1) to (5), in which the priority levels are used to specify an order, in the search, of poses of a distal end part of the robot relative to the work position.

According to this configuration, it is possible to set an order corresponding to poses of the distal end part of the robot, as the priority levels used in the search.

(7) The motion trajectory generation method according to (6), in which the robot is a welding robot, the distal end part is a welding torch, and the work directions are welding directions.

According to this configuration, in generation of a motion trajectory related to control of a robot used in a welding system, it is possible to efficiently generate an appropriate pose and its series of trajectories of the robot by reducing a processing time taken in the welding system.

(8) A motion trajectory generation apparatus for determining a motion trajectory of a robot having a plurality of drive axes upon carrying out work at a work position, the motion trajectory generation apparatus including:

obtaining means for obtaining a motion condition identified and corresponding to the work position; and generation means for generating a motion trajectory of the robot by carrying out a search for a plurality of motion trajectories that the robot is able to implement, on the basis of the motion condition, in which the generation means determines priority levels in the search on the basis of the motion condition and work directions for a plurality of work positions, and carries out the search for the plurality of motion trajectories on the basis of the priority levels.

According to this configuration, in generation of a motion trajectory related to control of a robot, it is possible to efficiently generate an appropriate pose and its series of trajectories of the robot while reducing a processing time taken to generate the motion trajectory.

(9) A robot system including:

a robot having a plurality of drive axes; and the motion trajectory generation apparatus described above.

According to this configuration, it is possible to provide a robot system that can, in generation of a motion trajectory related to control of a robot, efficiently generate an appropriate pose and its series of trajectories of the robot while reducing a processing time taken to generate the motion trajectory.

(10) A program for causing a computer to perform:

an obtaining step of obtaining a motion condition identified and corresponding to a work position at which a robot having a plurality of drive axes carries out work; and a generation step of generating a motion trajectory of the robot by carrying out a search for a plurality of motion trajectories that the robot is able to implement, on the basis of the motion condition, in which

18 in the generation step, priority levels in the search are determined on the basis of the motion condition and work directions for a plurality of work positions, and the search for the plurality of motion trajectories is carried out on the basis of the priority levels.

According to this configuration, in generation of a motion trajectory related to control of a robot, it is possible to efficiently generate an appropriate pose and its series of trajectories of the robot while reducing a processing time taken to generate the motion trajectory.

What is claimed is:

1. A motion trajectory generation method for generating a motion trajectory of a robot having a plurality of drive axes for carrying out work at a work position, the motion trajectory generation method comprising:

securing the robot to a mobile platform;

an obtaining step of obtaining a motion condition identified and corresponding to the work position;

a generation step of generating the motion trajectory of the robot by carrying out a search for a plurality of motion trajectories that the robot is able to implement, on the basis of the motion condition, wherein in the generation step, priority levels in the search are determined on the basis of the motion condition and work directions for a plurality of work positions, and the search for the plurality of motion trajectories is carried out on the basis of the priority levels;

determining a position of the mobile platform; and controlling the robot to move based on the position of the mobile platform and the motion trajectory.

2. The motion trajectory generation method according to claim 1, further comprising:

an evaluation step of evaluating the motion trajectories for which the search has been carried out on the basis of the priority levels, wherein when a motion trajectory evaluated as reaching or exceeding a threshold in the evaluation step is derived, the motion trajectory is determined and the search is terminated in the generation step.

3. The motion trajectory generation method according to claim 1, wherein the priority levels are determined by using a database specified in advance and corresponding to the motion condition.

4. The motion trajectory generation method according to claim 1, wherein the priority levels are determined by using a trained model for which a machine learning process using the motion condition as input and the priority levels in the search as output has been performed.

5. The motion trajectory generation method according to claim 1, wherein the priority levels are determined by using an evaluation function that uses the motion condition as a parameter.

6. The motion trajectory generation method according to claim 1, wherein the priority levels are used to specify an order, in the search, of poses of a distal end part of the robot relative to the work position.

7. The motion trajectory generation method according to claim 6, wherein the robot is a welding robot, the distal end part is a welding torch, and the work directions are welding directions.

8. A motion trajectory generation apparatus for generating a motion trajectory of a robot having a plurality of drive axes upon carrying out work at a work position, the motion trajectory generation apparatus comprising:

obtaining means for obtaining a motion condition identified and corresponding to the work position; and determination means for determining the motion trajectory of the robot by carrying out a search for a plurality of motion trajectories that the robot is able to implement, on the basis of the motion condition, wherein the determination means determines priority levels in the search on the basis of the motion condition and work directions for a plurality of work positions, and carries out the search for the plurality of motion trajectories on the basis of the priority levels, and wherein the robot is configured to be secured to a mobile platform, and the robot is controlled to move based on a position of the mobile platform and the motion trajectory.

9. A robot system comprising:

a robot having a plurality of drive axes; and the motion trajectory generation apparatus according to claim 8.

10. A non-transitory computer-readable medium storing computer readable instructions thereon that when executed by a computer cause the computer to perform a method comprising:

an obtaining step of obtaining a motion condition identified and corresponding to a work position at which a robot having a plurality of drive axes carries out work, the robot being secured to a mobile platform;

a generation step of generating a motion trajectory of the robot by carrying out a search for a plurality of motion trajectories that the robot is able to implement, on the basis of the motion condition, wherein in the generation step, priority levels in the search are determined on the basis of the motion condition and work directions for a plurality of work positions, and the search for the plurality of motion trajectories is carried out on the basis of the priority levels;

determining a position of the mobile platform; and controlling the robot to move based on the position of the mobile platform and the motion trajectory.

\* \* \* \* \*